No. 618,993. Patented Feb. 7, 1899.
L. PAGET.
ELECTRICAL BATTERY.
(Application filed July 8, 1897.)
(No Model.)
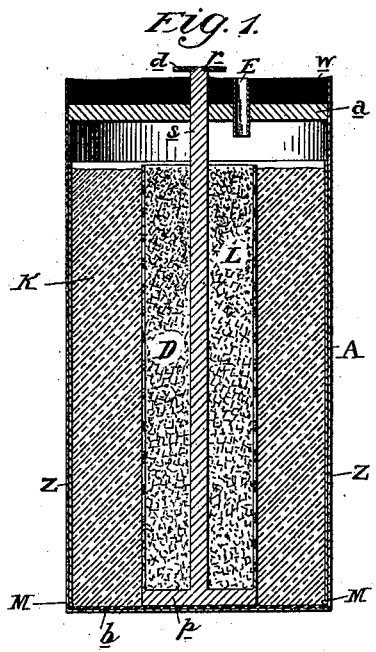
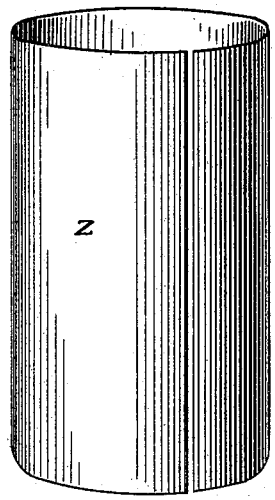
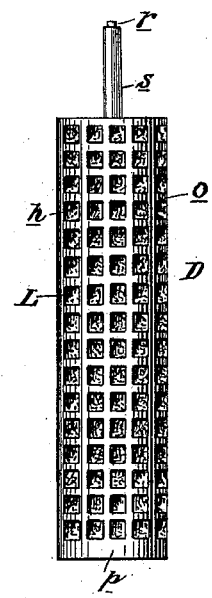
Witnesses
Inventor

UNITED STATES PATENT OFFICE.

LEONARD PAGET, OF NEW YORK, N. Y., ASSIGNOR TO THE RELIANCE LAMP ELECTRIC COMPANY, OF NEW JERSEY.

ELECTRICAL BATTERY.

SPECIFICATION forming part of Letters Patent No. 618,993, dated February 7, 1899.

Application filed July 8, 1897. Serial No. 643,806. (No model.)

*To all whom it may concern:*

Be it known that I, LEONARD PAGET, a citizen of the United States, residing at New York, in the county of New York and State of New York, have made a new and useful Invention in Electrical Batteries, of which the following is a specification.

My invention is directed particularly to improvements in that type of electrical batteries known in the art as "dry" or "non-fluid" batteries, in which the electrolyte or excitant is held or sustained by an absorbent material within the body of the cell; and its objects are, first, to devise a battery of the type indicated in which one of the electrodes is sustained by and constitutes the inner surface of a conducting retaining vessel, the other electrode being sustained therein within a comparatively firmly-packed body of absorbent material, the arrangement being such that there is a minimum amount of "local action" on open circuit; second, to provide an absorbent for an electrolyte or excitant of concentrated sulfuric acid which shall be unacted upon by the same and which will absorb a volume or bulk thereof substantially equal to the volume or bulk of the absorbent itself and with a minimum amount of weight; third, to devise a battery of the type indicated which is adapted for use with a concentrated solution of sulfuric acid without detrimental effects upon the parts thereof; fourth, to provide an electrode containing the depolarizing or active material which will not buckle or bend when in position because of its peculiar form, and, fifth, to devise a battery of the type indicated having a minimum weight, with its parts so organized or assembled that it will withstand unusual shocks without detriment in handling or usage.

For a full and clear understanding of my invention, such as will enable others skilled in the art to which it appertains to manufacture and use the same, reference is had to the following specification, and particularly to the claims at the end thereof, in which the essential points of novelty are pointed out, and also to the accompanying drawings illustrative thereof, in which—

Figure 1 is a vertical sectional view taken through one of my improved cells, Fig. 2 being a perspective view of the zinc or equivalent electrode as detached from its retaining vessel; and Fig. 3, a side elevational view of the electrode containing the depolarizing material, illustrating also the depolarizing material retained therein.

Referring now to the drawings in detail, D represents the electrode, containing the depolarizing material, which consists of a cylindrical retaining-casing $o$, having perforations $h$ and cast or made integral with a base $p$ and a central vertical stem $s$, said electrode being made, preferably, of antimonious lead, the upper part of the stem $s$ being shouldered at $r$ for the purpose of securing thereto, by riveting or otherwise, a conducting-washer or contact-surface $d$, which shall act as the conducting-contact for said electrode.

L represents the active material, packed within the electrode D.

$z$ represents the zinc or equivalent electrode, illustrated in detached form in perspective view in Fig. 2, the same consisting, preferably, of a thin sheet of zinc rolled into the form of a cylinder and inserted within the conducting retaining vessel A in the manner shown in Fig. 1, said retaining or conducting vessel being preferably of copper. It should also be sufficiently rigid to resist deterimental shocks and pressure when in use, but made as thin as the necessities of the case may demand, in order to materially diminish the weight of the structure. I have found that copper affords the best material for this conducting retaining vessel, next to which I prefer to use antimonious lead or type-metal. When the electrode $z$ is of zinc, both the vessel A and said electrode can be "quicked" or amalgamated in the well-known manner.

$a$ and $b$ represent insulating-disks, preferably of paraffined wood or cork, the disk $b$ being located at the bottom of the retaining vessel and designed to insulate the base $p$ of the electrode D therefrom, the disk $a$ constituting a sealing-disk secured in the upper end of the retaining vessel and acting also as a support for the stem $s$ of the electrode D, said disks being of such a nature as to fit very snugly within the retaining vessel.

E is a vent-tube made, preferably, of glass, vulcanite, or any material which will not be acted upon by the electrolyte, said vent-tube extending downward beneath the insulating-disk $a$ to a point such that should any of the electrolyte escape from the absorbent on turning the cell upside down it will not be discharged from the cell proper. $w$ represents the seal of the cell, and is composed of insulating material, which can be melted and poured upon the surface of the disk $a$. In practice I find Chatterton's compound melted with two or three times its weight of pure resin or colophony gives the best results to firmly attach the disk $a$ to the interior wall of the conducting retaining vessel A, and also firmly surrounds and secures the standard $s$ and vent-tube E in the manner shown in Fig. 1.

K represents the absorbent of the electrolyte, located within the body of the cell and between the two electrodes, said absorbent being preferably what is known as "kieselguhr" or infusorial earth.

I am aware that kieselguhr has been used as an absorbent for the excitant in dry batteries, and I make no claim, broadly, to this material as such an absorbent, my broadest claims hereinafter in this respect being directed in the combination of kieselguhr with concentrated sulfuric acid and other elements, as hereinafter particularly pointed out.

For an electrolyte I prefer to use a very strong or concentrated solution (about 40 per cent.) of sulfuric acid of 66° Baumé in water. I have found that such a strong solution, in addition to having greater electrical capacity and less resistance than a weak solution, actually sets up or establishes less action upon the zinc and copper when treated as hereinbefore specified than does a weak solution when the cell is on open circuit.

L represents the depolarizing material within the body of the electrode D, the same consisting of any suitable oxidant, such as peroxid of manganese, peroxid of lead, &c. With peroxid of manganese an electrolyte of chlorid of sodium or chlorid of ammonium might be employed, with diminished electromotive force, however, as compared with peroxid of lead.

The manner of assembling the hereinbefore-described cell is as follows: The copper-containing vessel A is first painted exteriorly, save as to its bottom, with a paint that will resist the "quicking" and acid solutions, this being necessary because any quicking or acid solution which might affect such exterior surface would prevent the setting at such points of the paint. The snugly-fitting insulating-disk $b$ is inserted in the bottom of the vessel A, and it is then interiorly almagamated by having a quicking solution poured into it for a few moments and rotated therein. The zinc cylinder having been rolled to form, as shown in Fig. 2, and quicked or amalgamated is then inserted and a few drops of mercury M are poured into the vessel and it (the vessel) rotated until the mercury adheres to the bottom of the zinc. This feature of adding further mercury after the electrode and interior surface of the retaining vessel A have been amalgamated is important for the reason that after the electrode is placed in position the additional mercury will continue to penetrate, by capillary action, between the zinc and the vessel to such an extent as to thoroughly permeate the entire mass of zinc, and thereby maintain the same free from attack by the electrolyte when the cell is on open circuit and also avoid any excessive "local action" between the zinc and the copper. A paste having been made of the electrolyte and the absorbent, this paste is introduced in sufficient quantity to rise to the proper height when the prepared electrode D is forced downward in the center thereof in the position shown in Fig. 1. This having been done, the sealing-disk $a$, with its vent, is inserted about the standard $s$, and finally there is poured upon this disk the molten sealing-wax $w$, which firmly secures all of the parts together. The conducting-washer or contact-surface $d$ is now secured upon the shoulder $r$ of the standard $s$ by riveting or otherwise and the cell is ready for use. When a number of cells are used in series, they are set one upon another, the bottom of the containing conducting-cell A of an upper cell being thereby connected with the top conducting-washer or conducting-surface $d$ of the cell beneath, the bottom of which latter is connected in turn with one conductor, another conductor being brought into contact with the washer of the upper cell to complete the circuit. To recharge the cell after discharge, an electric current is passed through it in the well-known manner of charging storage batteries.

Although I have hereinbefore defined my invention to be an improvement in non-fluid or dry batteries, I desire it understood that a number of the details of the battery itself might be used in connection with batteries of other types, such as liquid batteries or storage batteries, and in a manner which will at once readily suggest itself to those skilled in the art.

I have preferably chosen to designate the invention hereinbefore described as of the dry or non-fluid battery type for the reason that such a structure is capable of more general use in the arts and under such conditions as would often forbid the use of batteries, either primary or storage, such as are provided with purely fluid excitants.

Having thus described my invention, what I claim, and desire to secure by Letters Patent of the United States, is—

1. A battery having a metallic retaining vessel, in combination with a metallic electrode which fits snugly within said vessel, said electrode and the inner surface of the vessel being amalgamated, substantially as described.

2. A battery having a metallic retaining vessel and a metallic electrode which fits snugly therein, said electrode and the inner surface of the vessel being amalgamated, in combination with an additional supply of the amalgamating medium, such as mercury, so located that it will permeate between the electrode and the vessel, substantially as described.

3. A battery provided with a metallic retaining vessel and a metallic electrode snugly fitting against the inner wall thereof, said electrode and the inner surface of the vessel being amalgamated, in combination with an electrode of positive polarity and an electrolyte of concentrated sulfuric acid, substantially as described.

4. A battery consisting of a metallic retaining vessel, an electrode of zinc snugly fitting within the inner surface of said retaining vessel, said electrode and the inner surface of the vessel being amalgamated, in combination with an electrode of opposite polarity consisting of a perforated cylindrical retaining-casing having a centrally-located stem of conducting material; depolarizing material packed within said retaining-casing and an electrolyte of concentrated sulfuric acid, substantially as described.

5. A battery having an electrode of amalgamated zinc secured to the inner wall of a copper-retaining vessel and an electrode of opposite polarity consisting of a perforated cylindrical retaining-casing having a depolarizing material packed therein, in combination with an absorbent surrounding the positive electrode and an electrolyte of concentrated sulfuric acid, substantially as described.

6. A non-fluid or dry battery consisting of a metallic retaining-casing, a zinc electrode snugly fitting within the inner surface thereof, said inner surface and said electrode being amalgamated, in combination with an electrode of opposite polarity and an absorbent of "kieselguhr" separating the positive from the negative electrode, substantially as described.

7. A non-fluid or dry battery consisting of a metallic retaining-casing, a zinc electrode snugly fitting within the inner surface thereof, said inner surface and said electrode being amalgamated, in combination with an electrode of opposite polarity, an absorbent of kieselguhr which separates said electrodes, and an electrolyte of concentrated sufuric acid, substantially as described.

In testimony whereof I have hereunto subscribed my name this 7th day of July, 1897.

LEONARD PAGET.

Witnesses:
  O. T. BUGG,
  C. J. KINTNER.